UNITED STATES PATENT OFFICE.

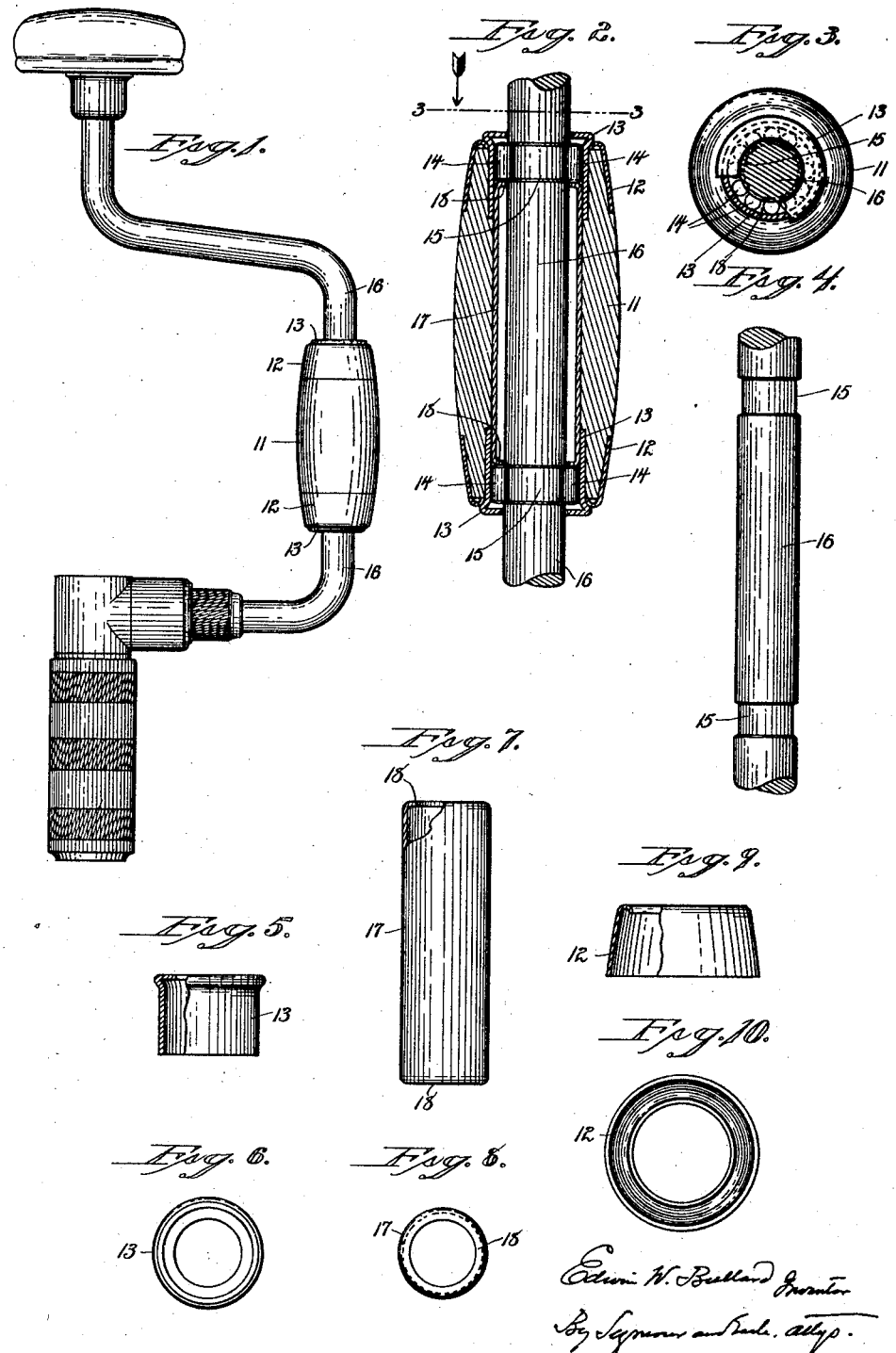

EDWIN W. BULLARD, OF WHITNEYVILLE, CONNECTICUT, ASSIGNOR TO WINCHESTER REPEATING ARMS CO., OF NEW HAVEN, CONNECTICUT, A CORPORATION.

BIT-BRACE HANDLE.

1,388,925.  Specification of Letters Patent.  Patented Aug. 30, 1921.

Application filed September 13, 1920. Serial No. 409,857.

*To all whom it may concern:*

Be it known that I, EDWIN W. BULLARD, a citizen of the United States, residing at Whitneyville, in the county of New Haven and State of Connecticut, have invented a new and useful Improvement in Bit-Brace Handles; and I do hereby declare the following, when taken in connection with the accompanying drawings, and the characters of reference marked thereon, to be a full, clear, and exact description of the same, and which said drawings constitute part of this application, and represent, in—

Figure 1. a view in elevation of a bit-brace provided with my improved handle.

Fig. 2. an enlarged view of the handle in longitudinal section with the central portion of the crank of the bit-brace shown in elevation and broken away.

Fig. 3. a broken view in transverse section on the line 3—3 of Fig. 2 looking downward.

Fig. 4. a detached broken view in elevation of the central portion of the crank showing its combined raceways and positioning grooves.

Fig. 5. a detached view partly in elevation and partly in section of one of the two combined bushings and race-ways of the handle.

Fig. 6. a reverse plan view thereof.

Fig. 7. a detached view in elevation of the positioning-sleeve of the handle, a portion thereof being broken away.

Fig. 8. a reverse plan view thereof.

Fig. 9. a detached view partly in elevation and partly in section of one of the two ferrules of the handle.

Fig. 10. a reverse plan view thereof.

My invention relates to an improved handle for bit-braces, the object being to provide a simple, durable, and reliable handle of the anti-friction type.

With these ends in view my invention consists in a bit-brace handle having certain details of construction and combinations of parts as will be hereinafter described and pointed out in the claim.

In carrying out my invention as herein shown, I employ a handle 11 provided at its respective ends with tapering ferrules 12 and combined bushings and raceways 13 which latter also serve as dust guards for the exclusion of dust from anti-friction rollers 14 which run in combined circumferential positioning-grooves and raceways 15 formed in the central portion of the crank 16 on which they are separated by substantially the length of the handle. The said handle is held against longitudinal movement upon the crank by means of a positioning-sleeve 17 mounted thereupon and having inwardly turned terminal faces 18 which bear against the inner ends of the rollers 14 and so hold the handle against longitudinal movement with respect to the crank, without interfering with the rotary movement thereupon. The outer ends of the parts 13 are flanged and serve to hold the ferrules in place as well as to form a finish for the ends of the handle into which the bushings are inserted so as to extend inward beyond the ends of the sleeve 17.

I claim:

In a bit-brace, the combination with a crank formed with circumferential combined raceways and positioning-grooves spaced apart, of a handle, a sheet-metal ferrule at each end thereof, a combined raceway and bushing inserted within each end of the handle, and having its outer end flared to engage with the adjacent ferrule, whereby the same is held in place, anti-friction rollers interposed between the said raceways and bushings, and a single sheet-metal positioning-sleeve located within the handle and turned inward at its respective ends to engage with the inner ends of the said rollers, whereby the sleeve co-acts with the said rollers to hold the said handle against longitudinal displacement.

In testimony whereof, I have signed this specification in the presence of two subscribing witnesses.

EDWIN W. BULLARD.

Witnesses:
ERIK S. PALMER,
A. E. HODGSON.